(12) United States Patent
Kim

(10) Patent No.: US 12,031,816 B2
(45) Date of Patent: Jul. 9, 2024

(54) DISPLACEMENT EXTENSOMETER

(71) Applicant: EDS Co., Ltd., Incheon (KR)

(72) Inventor: Chul Min Kim, Incheon (KR)

( * ) Notice: Subject to any disclaimer, the term of this patent is extended or adjusted under 35 U.S.C. 154(b) by 247 days.

(21) Appl. No.: 17/626,948

(22) PCT Filed: Jul. 16, 2019

(86) PCT No.: PCT/KR2019/008776
§ 371 (c)(1),
(2) Date: Jan. 13, 2022

(87) PCT Pub. No.: WO2021/010514
PCT Pub. Date: Jan. 21, 2021

(65) Prior Publication Data
US 2022/0260354 A1    Aug. 18, 2022

(30) Foreign Application Priority Data
Jul. 16, 2019  (KR) .................. 10-2019-0085619

(51) Int. Cl.
*G01B 7/16*  (2006.01)
*G01D 11/30*  (2006.01)

(52) U.S. Cl.
CPC ............... *G01B 7/16* (2013.01); *G01D 11/30* (2013.01)

(58) Field of Classification Search
CPC ...... G01B 7/16; G01B 5/0002; G01B 5/0016; G01B 5/30; G01D 11/30; G01M 5/0041
See application file for complete search history.

(56) References Cited

U.S. PATENT DOCUMENTS 4,094,189 A   6/1978  Serata
5,563,349 A * 10/1996  Burke ................. G01N 3/066
                                                        73/831

(Continued)

FOREIGN PATENT DOCUMENTS

KR   10-2002-0005291   1/2002
KR   10-0763795        10/2007

(Continued)

OTHER PUBLICATIONS

English Specification of 10-2002-0005291.

(Continued)

*Primary Examiner* — Christopher P McAndrew
*Assistant Examiner* — Zannatul Ferdous
(74) *Attorney, Agent, or Firm* — ANTONIO HA & U.S. PATENT, LLC

(57) ABSTRACT

The present invention relates to a displacement extensometer for measuring the linear displacement of an object to be measured, the displacement extensometer comprising: a first bracket installed at a reference point so as to provide support force; a second bracket fixed to an object to be measured; a displacement meter body fixed to the first bracket and including a center rod connected to the second bracket, so as to detect displacement while the center rod horizontally moves according to positions of the object to be measured; a first link connecting the displacement meter body to the first bracket; a second link connecting the center rod of the displacement meter body to the second bracket; and a friction compensation member provided in the displacement meter body so as to compensate for the friction due to sagging of the center rod while providing physical stress to the center rod.

5 Claims, 4 Drawing Sheets

(56) References Cited

U.S. PATENT DOCUMENTS 5,819,428 A * 10/1998 Meyer .................. G01B 7/16
33/787
2017/0030701 A1* 2/2017 Saxey .................. E04H 9/024

FOREIGN PATENT DOCUMENTS

| KR | 10-2012-0093382 | 8/2012 |
| KR | 10-1317629 | 10/2013 |
| KR | 10-2015-0025853 | 3/2015 |
| KR | 10-1794127 | 11/2017 |
| KR | 10-1967957 | 4/2019 |
| KR | 10-2002814 | 10/2019 |

OTHER PUBLICATIONS

English Specification of 10-1317629.
English Specification of 10-2015-0025853.
English Specification of 10-2002814.
English Specification of 10-2012-0093382.
English Specification of 10-0763795.
English Specification of 10-1794127.
English Specification of 10-1967957.

* cited by examiner

DISPLACEMENT EXTENSOMETER

TECHNICAL FIELD

The present invention relates to a displacement extensometer for displacement measurement used in a structural integrity test of a containment building of a nuclear power plant, and more particularly, to a displacement extensometer in which a displacement meter body may be easily installed in a horizontal state and which may enhance precision by canceling frictional force caused by sagging of a center rod measuring displacement.

BACKGROUND ART

In general, as one of the structural integrity tests (SITs) for containment buildings installed in nuclear power plants, there is a displacement test using a displacement measuring device.

A displacement measuring device generally called a displacement extensometer refers to a device that measures or meters the movement distance or position of an object, and its measurement range is commonly zero to a few millimeters (mm) or centimeters (cm).

A representative example of such a displacement measuring device is a magnetic sensor using the magnetic principle.

Specifically, a magnetic sensor using the magnetic principle is an element that converts magnetism into electricity and is a transducer in which a mechanical displacement causes a change in the magnetic flux generated between the primary coil and the secondary coil, that is, mutual inductance. Such a transducer is called a linear variable differential transformer (LVDT).

Here, LVDT refers to a type of electrical transducer that measures the linear distance difference. Three solenoid coils are positioned around a tube, and the middle coil is a main one, and the other two are positioned outside.

In this case, a cylindrical magnet core moves along the center of the tube to indicate the position value of the measurement object. Therefore, the LVDT, which converts mechanical displacement into an electrical signal, is a transducer that changes the magnetic flux induced from the primary coil to the secondary coil by the movement of the core or armature, that is, the mutual inductance. In proportion to the displacement of the core which is mechanically or electrically separated and movable, an electrical output is generated. The position of the valve is controlled according to the amount of the output.

However, in such a conventional displacement measuring device, if the wire connected to the measurement object is long, the wire may sag so that the center rod where the core installed sags, causing friction with the housing.

Accordingly, the conventional displacement measuring device may cause an error in measurement due to the frictional force of the center rod, deteriorating precision.

Further, the conventional displacement measuring device has the problems that it is cumbersome to fix the displacement meter body to the measurement object, especially in the horizontal state of the displacement meter body.

Therefore, a need exists fora new technique to address such issues.

As a prior art document in the technical field to which the present invention pertains, there is Korean Patent Application Publication No. 10-2012-93382.

DETAILED DESCRIPTION OF THE INVENTION

Technical Problems

The present invention was created to address the foregoing problems of the prior art and aims to provide a high-resolution displacement extensometer that may minimize errors in displacement measurement by cancelling out the frictional force caused by sagging of the wire or the center rod connected to the object for displacement measurement.

Specifically, an object of the present invention is to provide a high-resolution displacement extensometer capable of canceling the frictional force of the center rod by periodically providing vibrations to the center rod inside the displacement meter body.

Further, an object of the present invention is to provide a high-resolution displacement extensometer that may firmly and easily fix the first bracket and the second bracket fixed to the measurement object, and in particular, guide the first bracket and the second bracket to be installed in a horizontal state while fixing them.

MEANS TO ADDRESS THE PROBLEMS

To achieve the foregoing objectives, according to an embodiment of the present invention, a displacement extensometer measuring a linear displacement of a measurement object may comprise a first bracket installed at a reference point to provide a supporting force; a second bracket fixed to the measurement object; a displacement meter body fixed to the first bracket, including a center rod connected to the second bracket, and detecting a displacement as the center rod is horizontally moved according to a position of the measurement object; a first link connecting the displacement meter body with the first bracket; a second link connecting the center rod of the displacement meter body with the second bracket; and a friction compensation member provided in the displacement meter body and providing physical stress to the center rod to cancel a frictional force due to sagging of the center rod.

In this case, the displacement extensometer may further comprise a first fixing member detachably fixing the first bracket to the reference point; a second fixing member detachably fixing the second bracket to the measurement object; and a centering member guiding the first bracket to be horizontal with the second bracket while visually guiding an installation position of one of the first bracket and the second bracket to the other.

Further, the friction compensation member may include at least one vibration motor built in the displacement meter body, connected to the center rod, and vibrating the center rod in a preset period.

Further, the displacement meter body may include a displacement meter housing having a first end connected with the first link and a second end having a withdrawal hole through which the center rod is drawn out; a load plate fixed to the center rod while being movably built in the displacement meter housing and horizontally moving along with the center rod; a plurality of guide rods installed along a length direction of the displacement meter housing to movably guide the load plate; return springs provided on the guide rods and elastically compressed by a movement of the load plate and returning the load plate to an original position; a plurality of solenoid coils built in the displacement meter housing, positioned outside the center rod, and generating a magnetic field; and a magnetic body installed in the center rod, positioned between the solenoid coils, and providing, along with the solenoid coils, to an electrical output according to the displacement while moving along with the center rod, and wherein the vibration motor is attached to the load plate and operates to vibrate the load plate.

Further, the second link may include an invar wire connected to the second bracket; and a turnbuckle connecting the invar wire and the center rod and adjusting an interval between the invar wire and the center rod.

Further, the first link may include a first fork fixed to the first bracket; a second fork fixed to the displacement meter body while being orthogonal to the first fork; and a tilting block provided between the first fork and the second fork to allow tilting in upper and lower directions and left and right directions of the displacement meter body.

Effects of the Invention

According to an embodiment of the present invention, in the displacement extensometer, as the vibration motor constituting the friction compensation member operates in a preset period to provide vibration to the center rod, the frictional force due to sagging of the center rod may be canceled, reducing an error rate due to frictional force.

In particular, according to an embodiment of the present invention, in the displacement extensometer, the vibration motor is attached to the load plate fixed to the center rod, so that the vibration generated by the vibration motor may be smoothly provided to the center rod as well as the invar wire to cancel the friction force.

Further, according to an embodiment of the present invention, in the displacement extensometer, the first bracket and the second bracket may be firmly and easily fixed to the object by the first fixing member and the second fixing member. In particular, since one installation position is visually guided to the other by the centering member while the first bracket and the second bracket are installed, the first bracket and the second bracket may be accurately installed in a horizontal state with each other.

Further, according to an embodiment of the present invention, the displacement extensometer may easily adjust the distance between the measurement object and the displacement meter body because the second link includes the turnbuckle.

Further, according to an embodiment of the present invention, in the displacement extensometer, the first link includes a pair of forks facing each other orthogonally to each other, thus allowing tilting of the displacement meter body in the upper and lower directions and left and right directions and hence keeping the displacement meter body horizontal.

Other objects of the present invention are not limited to the foregoing objects, and other objects will be apparent to one of ordinary skill in the art from the following detailed description.

MODE TO PRACTICE THE INVENTION

Hereinafter, embodiments of the disclosure are described in detail with reference to the accompanying drawings. The same references may be used to denote the same or similar elements throughout the drawings and the specification, and no duplicate description is given of the elements. As used herein, the terms "module" and "unit" are provided solely for ease of description and these terms may be used interchangeably but rather than being distinct in meaning or role.

When determined to make the subject matter of the present invention unclear, the detailed description of the known art or functions may be skipped. The accompanying drawings are provided merely for a better understanding of the disclosure and the technical spirit or the scope of the invention are not limited by the drawings.

The terms coming with ordinal numbers such as 'first' and 'second' may be used to denote various components, but the components are not limited by the terms. The terms are used to distinguish one component from another.

It will be understood that when an element or layer is referred to as being "on," "connected to," "coupled to," or "adjacent to" another element or layer, it can be directly on, connected, coupled, or adjacent to the other element or layer, or intervening elements or layers may be present. In contrast, when a component is "directly connected to" or "directly coupled to" another component, no other intervening components may intervene therebetween.

It will be further understood that the terms "comprise" and/or "have," when used in this specification, specify the presence of stated features, integers, steps, operations, elements, and/or components, but do not preclude the presence or addition of one or more other features, integers, steps, operations, elements, components, and/or groups thereof.

The displacement extensometer according to the present invention may be mainly used in building structures and, particularly, is suitable for, but not limited to, nuclear power plant SITs.

Hereinafter, for convenience of description, a displacement extensometer for a SIT of a nuclear power plant is described as a main example.

Figure 1:
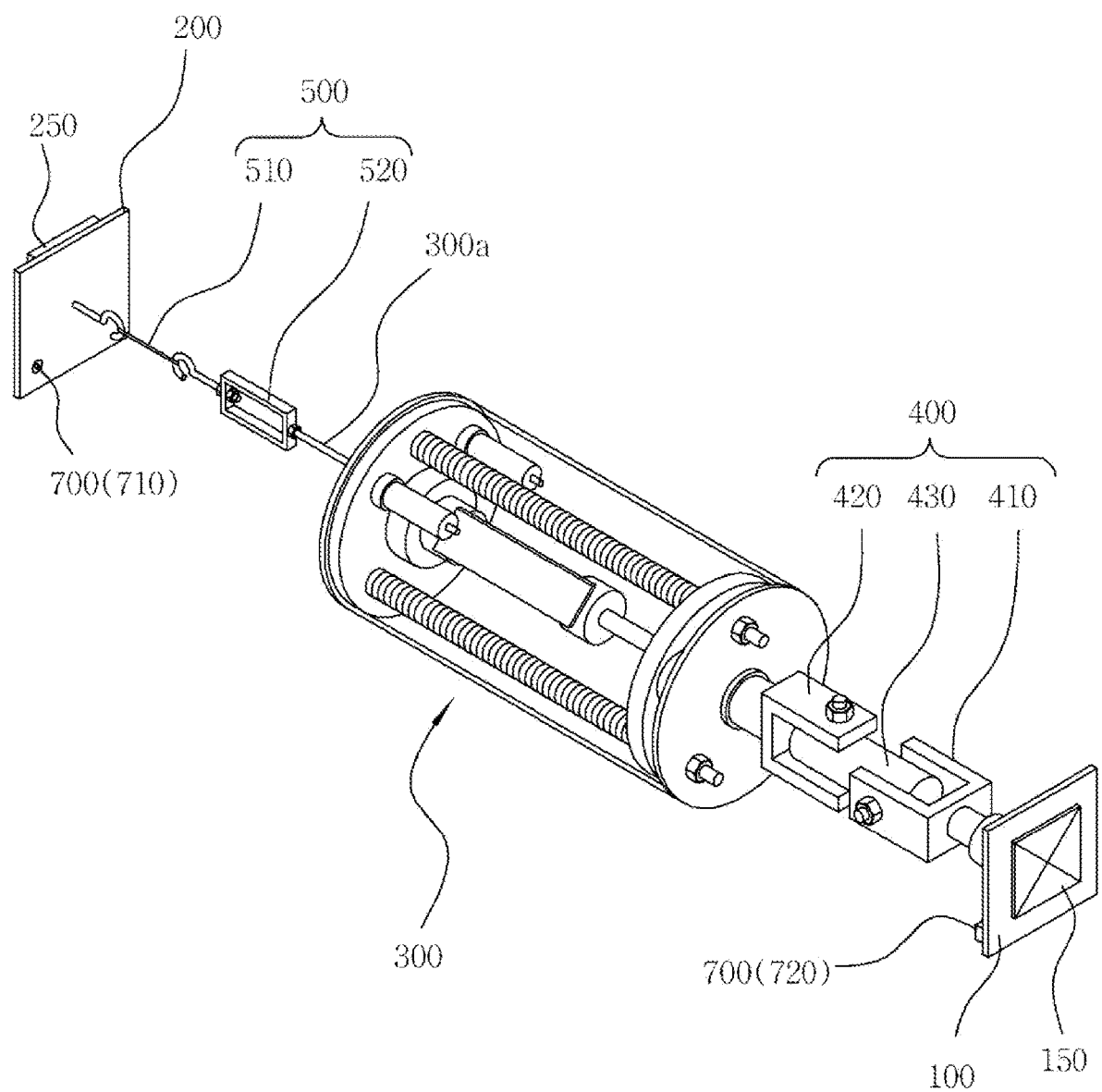
FIG. 1 is an exploded perspective view illustrating a displacement extensometer according to an embodiment of the present invention.
Figure 2:
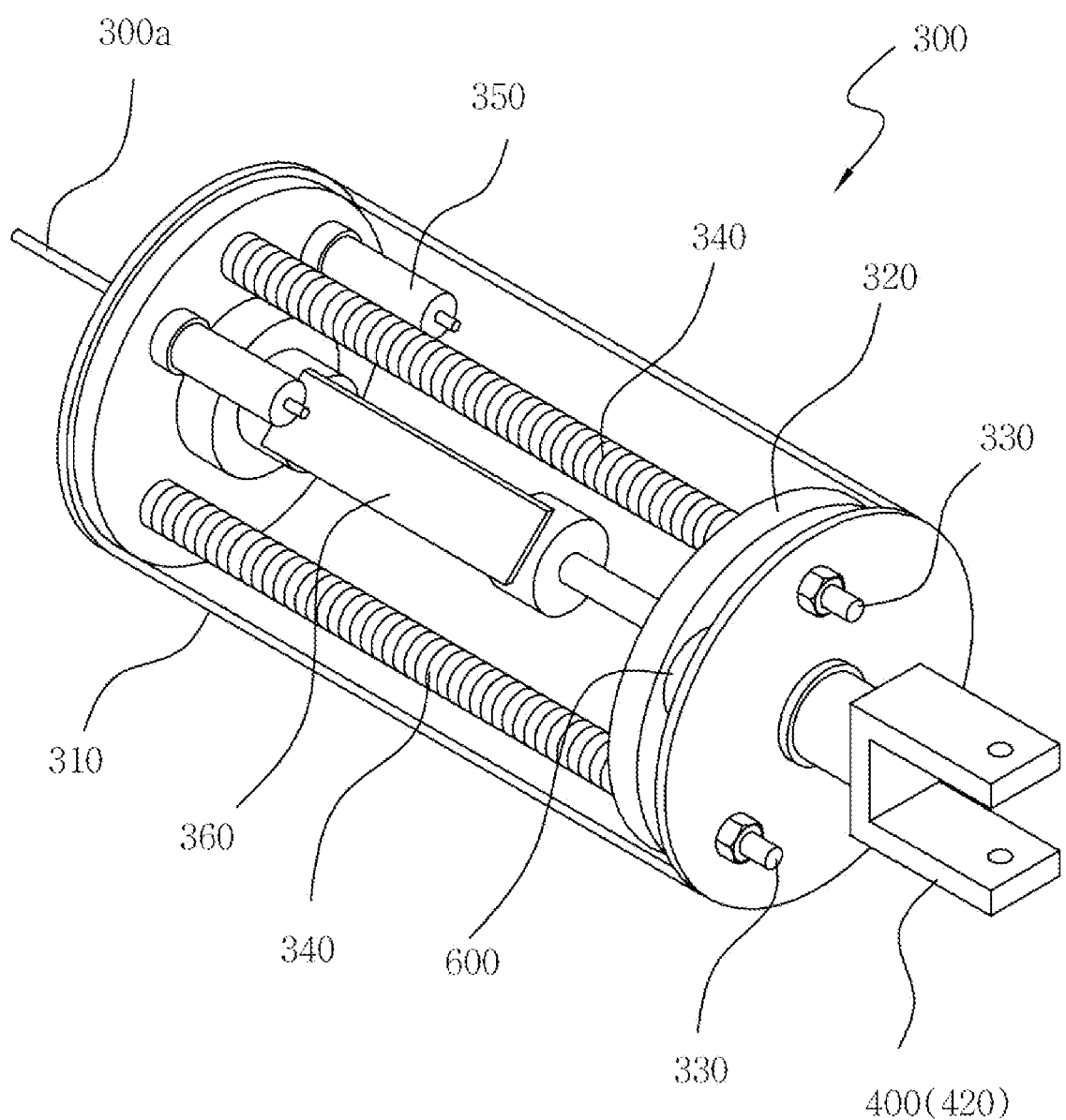
FIG. 2 is a perspective view illustrating a displacement meter body according to an embodiment of the present invention.
Figure 3:
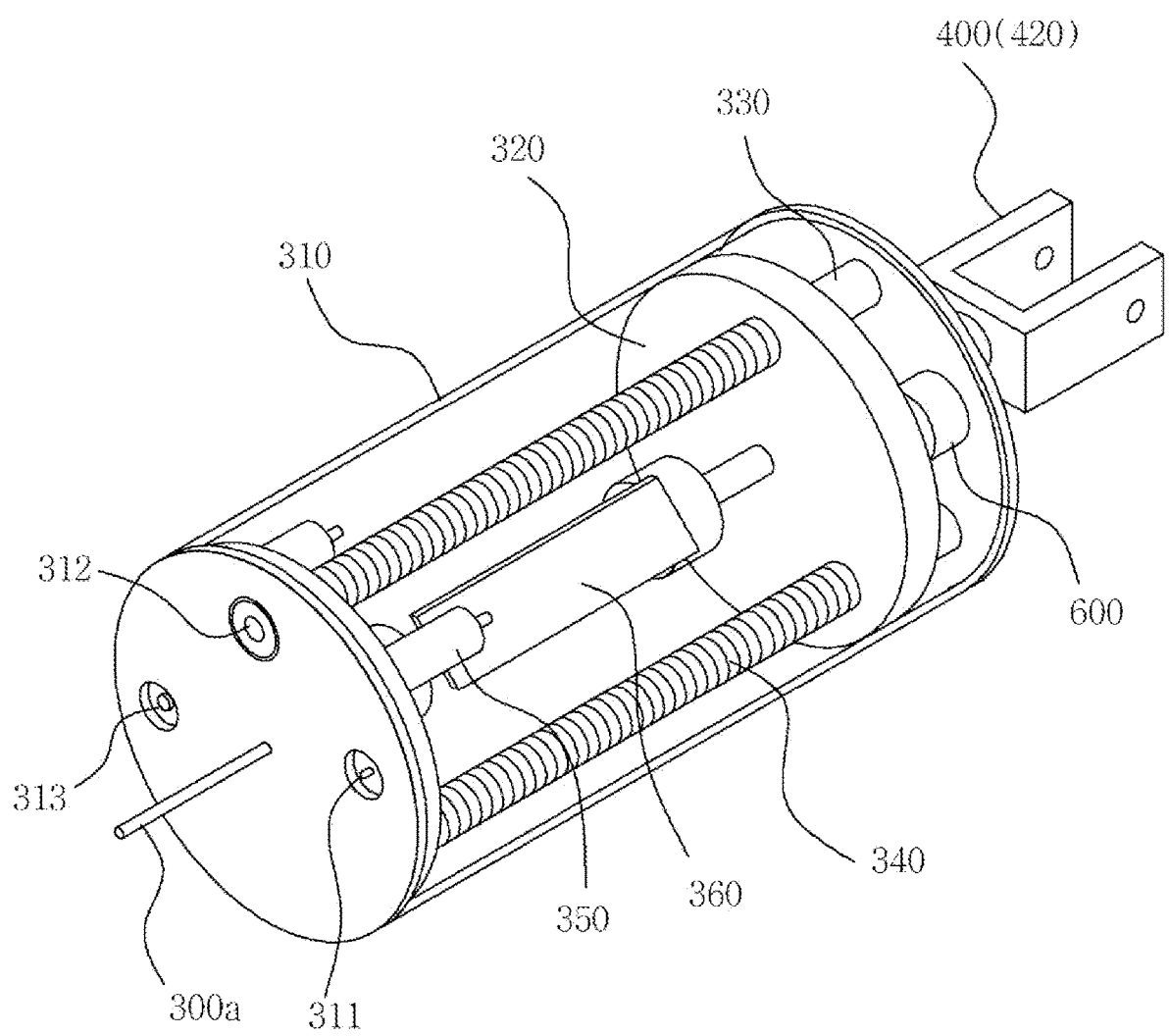
FIG. 3 is a perspective view illustrating the displacement meter body of FIG. 2 as viewed in the opposite direction.
Figure 4:
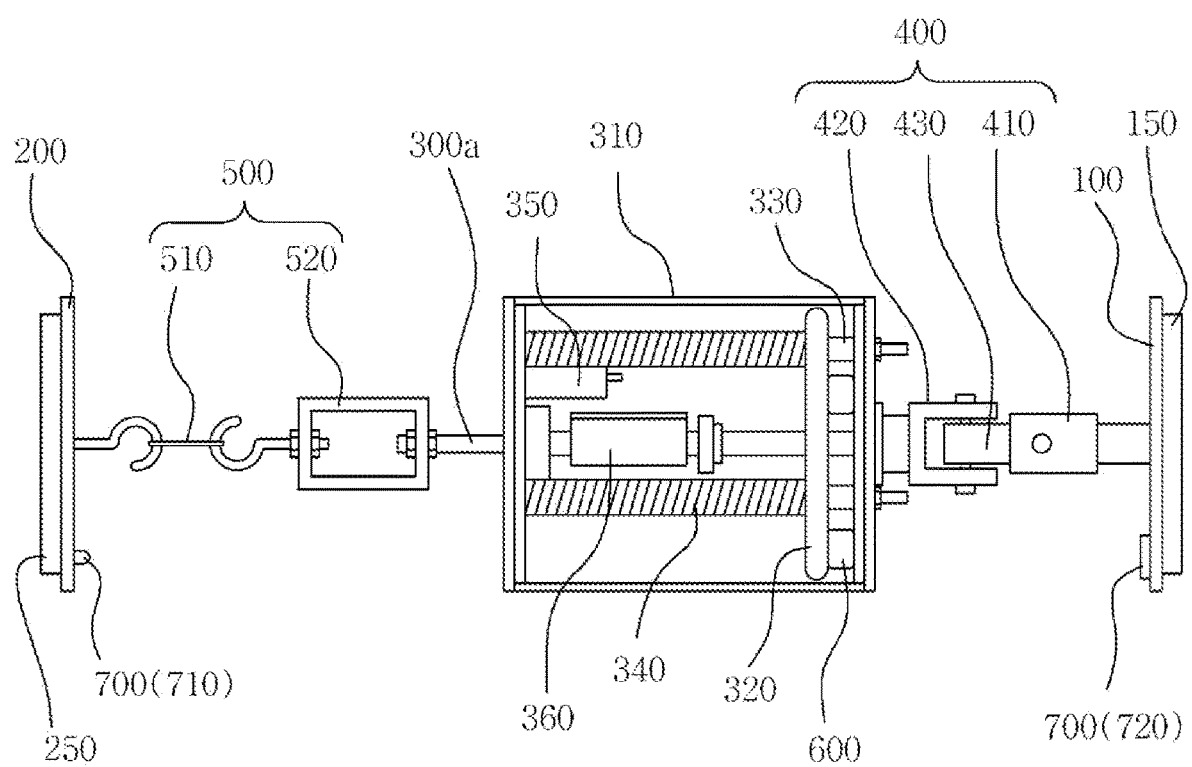
FIG. 4 is a front view illustrating a displacement extensometer according to an embodiment of the present invention.

FIG. 1 is an exploded perspective view illustrating a displacement extensometer according to an embodiment of the present invention. FIG. 2 is a perspective view illustrating a displacement meter body according to an embodiment of the present invention. FIG. 3 is a perspective view illustrating the displacement meter body of FIG. 2 as viewed in the opposite direction. FIG. 4 is a front view illustrating a displacement extensometer for a SIT of a nuclear power plant according to an embodiment of the present invention.

According to an embodiment of the present invention, the displacement extensometer is a device for measuring the linear displacement of a measurement object, e.g., a device for measuring a change in the distance between the measurement object and a reference point in a tensile test of the measurement object.

Specifically, according to an embodiment of the present invention, the displacement extensometer may include a first bracket 100, a second bracket 200, a displacement meter body 300, a first link 400, a second link 500, and a friction compensation member 600.

The first bracket 100 may form a reference point for displacement measurement while supporting a first end of two opposite ends in the length direction of the displacement meter body 300 to be described below and may provide a supporting force for installation of the first end of the displacement meter body 300 while being installed at the reference point.

The first bracket 100 may be coupled to the displacement meter body 300 via the first link 400 to be described below.

Specifically, the first link 400 may include a first fork 410, a second fork 420 and a tilting block 430 as shown in FIGS. 1 and 4.

The first fork 410 may be fixed to the first link 400 and include fork portions divided to two opposite sides to rotatably receive the tilting block 430 described below between the fork portions.

The second fork 410 has fork portions divided in the same manner as those of the first fork 410 and is fixed to the displacement meter body 300 while forming a state of being orthogonal to the first fork 410. The second fork 410 may rotatably receive the tilting block 430 described below, between the fork portions.

The tilting block 430 is a component that is coupled between the first fork 410 and the second fork 420 and allows tilting of the displacement meter body 300 in the upper and lower directions and left and right directions while rotating in the upper and lower directions or the left and right directions.

In other words, the tilting block 430 is formed in the shape of a rod having a predetermined length, so that one end of the tilting block 430 may be coupled to the first fork 410 in the upper and lower directions, and the other end thereof may be rotatably coupled to the second fork 420 in the left and right directions, allowing tilting of the displacement meter body 300 fixed to the second fork 420 in the left and right directions and upper and lower directions.

The second bracket 200 is a component that is fixed to the measurement object and supports a second end of the two opposite ends in the length direction of the displacement meter body 300.

In other words, the second bracket 200 is fixed to an object to be measured for displacement while horizontally facing the first bracket 100 and supports the second end of the displacement meter body 300.

The second bracket 200 may be coupled to the displacement meter body 300 via the second link 500 to be described below.

Specifically, the second link 500 may include an invar wire 510 and a turnbuckle 520 as shown in FIGS. 1 and 4.

The invar wire 510 is a component that connects the second bracket 200 and the displacement meter body 300 and is formed of a wire having a predetermined length while being formed of a material having a small coefficient of expansion to enhance measurement precision. A first end of the invar wire 510 is fixed to the second bracket 200 while a second end thereof is fixed to the displacement meter body 300 via the turnbuckle 520 described below.

The turnbuckle 520 is a component that adjusts the tension of the invar wire 510 by adjusting the interval between the invar wire 510 and the displacement meter body 300.

Specifically, the turnbuckle 520 may be coupled to the invar wire 510 and the center rod 300a of the displacement meter body 300 through screw rods screwed to two opposite ends thereof. The turnbuckle 520 closes the screw rods by forward rotation or opens the screw rods by reverse rotation, thereby adjusting the interval between the interval between the invar wire 510 and the center rod 300a of the displacement meter body 300.

The displacement meter body 300 is a component for detecting and measuring the displacement of the measurement object and is installed between the first bracket 100 and the second bracket 200 to measure the displacement of the measurement object through the horizontal movement of the center rod 300a connected to the second bracket 200.

As shown in FIGS. 2 and 3, the displacement meter body 300 may include a displacement meter housing 310, a load plate 320, guide rods 330, return springs 340, solenoid coils 340, and a magnetic body 360.

The displacement meter housing 310 constitutes the body of the displacement measuring device and is formed in a cylindrical shape and includes an installation space formed therein.

This displacement meter housing 310 is provided with the above-described second fork 420 at a first end and is connected to the tilting block 430 and fixed to the first bracket 100. The above-described center rod 300a is drawn out of a second end of the displacement meter housing 310 and is fixed to the above-described turnbuckle 520.

Further, the displacement meter housing 310 is provided with a connector 311 for connecting a power source and it is provided with a laser pointer 312 to irradiate a laser beam to the measurement object to for zeroing during installation.

Further, the displacement meter housing 310 is provided with a variable resistor 313 to convert the horizontal displacement caused by the horizontal movement of the center rod 300a into a change in electrical resistance.

The load plate 320 is a member that moves together with the center rod 300a. As shown in FIGS. 2 and 3, the load plate 320 is movably embedded in the displacement meter housing 310 and fixed to the center rod 300a and moves along with the center rod 300a according to the displacement of the measurement object.

The guide rods 330 movably guide the load plate 320 and are fixed along the length direction of the displacement meter housing 310 to be fitted into the load plate 320 so that the load plate 320 is movable.

In other words, when the displacement of the measurement object increases, the load plate 320, along with the center rod 300a, moves toward the measurement object along the length direction of the guide rods 300.

The return springs 340 are coupled along the length direction of the guide rods 330 and are elastically compressed by the movement of the load plate 320 and return the load plate 320 to its original position.

In other words, when the displacement of the measurement object increases, the load plate 320, together with the center rod 300a, moves while compressing the return springs 340 of the guide rods 330 and, when the displacement of the measurement object decreases, the load plate 320 is returned to its original position by the elastic force of the return springs 340.

The solenoid coils 350 are built in the displacement meter housing 100 to generate a magnetic field. The solenoid coils 350 are operated by power applied through the connector 311 of the displacement meter housing 310 to generate a magnetic field.

The magnetic body 360 is positioned between the solenoid coils 350 while being installed on the center rod 300a. As the displacement of the measurement object increases, the magnetic body 360, together with the center rod 300a, moves, generating, together with the solenoid coils 350, an electrical output.

In other words, the displacement extensometer according to the present invention may measure the displacement through the position of the magnetic body 360 moving together with the center rod 300a according to the displacement of the measurement object.

Meanwhile, as the distance from the measurement object increases, the invar wire 510 sags, the center rod 300a does not remain in the horizontal state but is inclined to sag and contacts the through hole of the displacement meter housing 310, causing a frictional force.

The friction compensation member 600 may cancel the friction force that occurs as the center rod 300 sags. The friction compensation member 600 may cancel the frictional force by providing physical stress to the center rod 300a.

For example, the friction compensation member 600 may be formed of a vibration motor that is built in the displacement meter body 300 to vibrate the center rod 300a. Preferably, the friction compensation member 600 may vibrate the center rod 300a while operating in a preset period, thereby canceling the friction to thereby reduce an error rate during displacement measurement.

Specifically, the vibration motor constituting the friction compensation member 600 may be attached to the above-described load plate 320 to periodically vibrate the load plate 320. In this case, the vibration generated by the vibration motor may be transferred up to the displacement meter body 300 and the invar wire 510, as well as to the center rod 300a, thereby canceling the frictional force.

In other words, the vibration motor may cancel the friction of the center rod 300a with the through hole of the displacement meter housing 310 by vibrating the center rod 300a through its periodic operation and may prevent friction by spacing the center rod 300a apart from the through hole through vibration.

Thus, the displacement extensometer according to an embodiment of the present invention may be free from a reduction in measurement current even when the invar wire 510 is long and may reduce in the stratified behavior and residual deviation phenomenon, thus reducing an error rate.

Meanwhile, according to an embodiment of the present invention, the displacement extensometer further may include a first fixing member 150, a second fixing member 250, and a centering member 700 as shown in FIG. 1.

The first fixing member 150 is a component for detachably fixing the first bracket 100 to the reference point.

For example, the first fixing member 150 may be formed of a fixing bolt that passes through the first bracket 100 and is fastened to the reference point.

Alternatively, the first fixing member 150 may be configured as a suction plate that is suctioned and fixed to the reference point while being detachably fixed to the rear surface of the first bracket 100.

Alternatively, the first fixing member 150 may be configured as a magnet that is provided as the same body as the first bracket 100 and is fixed to the reference point of the metal material through magnetic force.

The second fixing member 250 is a component for detachably fixing the second bracket 200 to the measurement object.

For example, the second fixing member 250 may be formed of a fixing bolt that passes through the second bracket 200 and is fastened to the reference point.

Alternatively, the second fixing member 250 may be configured as a suction plate that is suctioned and fixed to the reference point while being detachably fixed to the rear surface of the second bracket 200.

Alternatively, the second fixing member 250 may be configured as a magnet that is provided as the same body as the second bracket 200 and is fixed to the reference point of the metal material through magnetic force.

The centering member 700 is a component that guides the center of the first bracket 100 and the center of the second bracket 200 to form a horizontal state with each other.

Specifically, the centering member 700 visually guides the installation position of one of the first bracket 100 and the second bracket 200 to the other, thereby allowing the center of the first bracket 100 to be horizontally aligned with the center of the second bracket 200.

In other words, the first bracket 100 and the second bracket 200 may be fixed through the first fixing member 150 and the second fixing member 250 while forming a horizontal state with each other by the centering member 700.

Here, the centering member 700 may include a pointer 710 that is provided on one of the first bracket 100 and the second bracket 200 to irradiate light to the other and a light receiving portion 720 that is provided on the other one of the first bracket 100 and the second bracket 200 in a position corresponding to the pointer 710 to receive the light from the pointer 710 to thereby provide a reference point.

For example, as shown in FIG. 1, the pointer 710 which is provided on the second bracket 200 radiates light to the first bracket 100, thereby visually guiding the installation position of the second bracket 200.

Further, as shown in FIG. 1, the light receiving portion 720 may be provided on the first bracket 100 in a position corresponding to the pointer 710 to receive the light from the pointer 710.

Thus, the user may install the first bracket 100 and the second bracket 200 in a state of being horizontal to each other by aligning the light from the pointer 710 to the light receiving portion 720 while installing the first bracket 100 after installing the second bracket 200.

As described above, according to an embodiment of the present invention, in the displacement extensometer, as the vibration motor constituting the friction compensation member 600 operates in a preset period to provide vibration to the center rod 300a, the frictional force due to sagging of the center rod 300a may be canceled, reducing an error rate due to frictional force.

Although embodiments of the present invention have been described with reference to the accompanying drawings, It will be appreciated by one of ordinary skill in the art that the present disclosure may be implemented in other various specific forms without changing the essence or technical spirit of the present disclosure. Thus, it should be noted that the above-described embodiments are provided as examples and should not be interpreted as limiting. Each of the components may be separated into two or more units or modules to perform its function(s) or operation(s), and two or more of the components may be integrated into a single unit or module to perform their functions or operations.

It should be noted that the scope of the present invention is defined by the appended claims rather than the described description of the embodiments and include all modifications or changes made to the claims or equivalents of the claims.

LEGEND OF REFERENCE NUMBERS

100: first bracket
150: first fixing member
200: second bracket
250: second fixing member
300: displacement meter body
300a: center rod
310: displacement meter housing 320: load plate
330: guide rod
340: return spring
350: solenoid coil
360: magnetic body
400: first link
410: first fork
420: second fork
430: tilting block
500: second link
510: invar wire
520: turnbuckle
600: friction compensation member
700: centering member
710: pointer
720: light receiving portion

The invention claimed is:

1. A displacement extensometer measuring a linear displacement of a measurement object, the displacement extensometer comprising:
    a first bracket installed at a reference point to provide a supporting force;
    a second bracket fixed to the measurement object;
    a displacement meter body fixed to the first bracket, including a center rod connected to the second bracket, and detecting a displacement as the center rod is horizontally moved according to a position of the measurement object;
    a first link connecting the displacement meter body with the first bracket;
    a second link connecting the center rod of the displacement meter body with the second bracket; and
    a friction compensation member provided in the displacement meter body and providing physical stress to the center rod to cancel a frictional force due to sagging of the center rod, wherein the friction compensation member includes at least one vibration motor built in the displacement meter body, connected to the center rod, and vibrating the center rod in a preset period.

2. The displacement extensometer of claim 1, further comprising:
    a first fixing member detachably fixing the first bracket to the reference point;
    a second fixing member detachably fixing the second bracket to the measurement object; and
    a centering member guiding the first bracket to be horizontal with the second bracket while visually guiding an installation position of one of the first bracket and the second bracket to the other.

3. The displacement extensometer of claim 1, wherein the displacement meter body includes:
    a displacement meter housing having a first end connected with the first link and a second end having a withdrawal hole through which the center rod is drawn out;
    a load plate fixed to the center rod while being movably built in the displacement meter housing and horizontally moving along with the center rod;
    a plurality of guide rods installed along a length direction of the displacement meter housing to movably guide the load plate;
    return springs provided on the guide rods and elastically compressed by a movement of the load plate and returning the load plate to an original position;
    a plurality of solenoid coils built in the displacement meter housing, positioned outside the center rod, and generating a magnetic field; and
    a magnetic body installed in the center rod, positioned between the solenoid coils, and providing, along with the solenoid coils, to an electrical output according to the displacement while moving along with the center rod, and wherein the vibration motor is attached to the load plate and operates to vibrate the load plate.

4. The displacement extensometer of claim 1, wherein the second link includes an invar wire connected to the second bracket; and a turnbuckle connecting the invar wire and the center rod and adjusting an interval between the invar wire and the center rod.

5. The displacement extensometer of claim 1, wherein the first link includes a first fork fixed to the first bracket; a second fork fixed to the displacement meter body while being orthogonal to the first fork; and a tilting block provided between the first fork and the second fork to allow tilting in upper and lower directions and left and right directions of the displacement meter body.

* * * * *